Patented Nov. 18, 1947

2,430,874

UNITED STATES PATENT OFFICE 2,430,874

PREPARATION OF ETHYLENEUREA

George C. Hale, Dover, N. J.

No Drawing. Application March 1, 1944,
Serial No. 524,575

6 Claims. (Cl. 260—309)

(Granted under the act of March 3, 1883, as
amended April 30, 1928; 370 O. G. 757)

The invention described herein may be manufactured and used by or for the Government for governmental purposes, without the payment to me of any royalty thereon.

This invention relates to the preparation of ethyleneurea, a compound from which explosives of special value can be derived. The compound ethyleneurea has received very little attention in the past. Its synthesis was first reported by Fisher and Koch in 1885, who prepared it by digesting ethylenediamine and ethyl carbonate at a temperature of about 180° C. It is also reported in the chemical literature to have been formed by electrolysis of parabanic acid, by desulphuring ethylene thiourea with mercuric oxide, and by heating water solutions of ethyleneguanidine or ethylenediisocyanate.

I have studied the original process of Fisher and Koch in great detail with a view to establishing the most favorable conditions for the production of ethyleneurea by this process. While this effort was successful in producing a compound of satisfactory purity, it was objectionable because of the relatively high cost of the reactants. Obviously, it is impossible to produce a compound cheaply if all of the materials used in its preparation are expensive.

Owing to special interest in certain compounds derived from ethyleneurea, I have given much thought and effort to methods for the preparation of the latter which would involve the use of cheaper or more readily available raw materials than those previously used in preparing the compound. The idea was conceived that if ammonium carbonate, which is commercially available at low cost, could be used as a starting material, a substantial reduction would be gained in the cost of preparing ethyleneurea and, hence, in the cost of its derivatives. There is no record so far as I am aware, that ethyleneurea has ever been synthesized from ammonium carbonate and, in fact, no record that such a synthesis was ever attempted.

I have devised a procedure whereby ammonium carbonate can be used as a starting material for the production of ethyleneurea, this new process offering great possibilities for the preparation of the compound from these cheap, commercially available chemicals. Thus, I have found that by reacting ammonium carbonate with ethylene derivatives, such as for example ethyleneglycol, ethylenediamine or ethyleneoxide, the desired compound ethyleneurea can be produced. The reactions involving ammonium carbonate and certain desired ethylene derivatives follow, which are typical of the type of reaction wherein an ethylene derivative and ammonium carbonate are reacted:

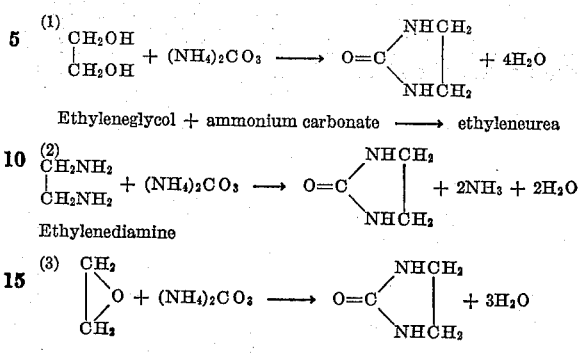

Ethyleneglycol + ammonium carbonate ⟶ ethyleneurea

Ethylenediamine

Ethyleneoxide

The conditions under which these reactions are carried out may be those which will affect the combination since it has been found that the product ethyleneurea is obtained when the ammonium carbonate and a selected ethylene derivative are reacted in a closed vessel at elevated temperatures with superatmospheric pressure being thereby produced. With other selected ethylene derivatives, the reactions are best carried out at atmospheric or even reduced pressure in order to eliminate the ammonia produced in the course of the reaction. It will be noted that in two of the above reactions cited, water is produced while in the other ammonia and water results in addition to the ethyleneurea.

It has been found in carrying out the reactions in which ammonia is produced, it is desirable to remove the ammonia as completely as possible as it is formed.

The following example is typical of the reaction between ammonium carbonate and an ethylene derivative.

Two hundred and ninety-one grams of ethylenediamine and 480 grams of ammonium carbonate were slowly mixed and when frothing ceased, the mixture was heated in a flask placed in an oil bath and connected to a reflux condenser. The temperature of the mixture was gradually raised to about 145° C. and held at this point for several hours. Upon removing the source of heat and cooling the flask to room temperature, a viscous liquid mass was obtained. This mass was then extracted with alcohol, and from the residue obtained by distilling off the alcohol, a white crystalline compound was obtained having a melting point of 131° C., which agrees closely with the melting point of 131.8° C. for pure ethyleneurea.

It was further identified as such by the method of mixed melting points and also by the method of mixed fusion of the crystals from the experiment with a known pure sample of ethyleneurea.

Since the process for producing ethyleneurea by reaction between ammonium carbonate and ethylene derivatives was first conceived by me and means for accomplishing this general type of reaction demonstrated by me, I do not wish to be limited as to the details of the means, the basic ingredients involved in the reaction or the methods for conducting the reactions since it is obvious from the above that the reactions will proceed under various detailed conditions.

I claim:

1. The process for the preparation of ethyleneurea which comprises heating ammonium carbonate with a material selected from the group consisting of ethyleneglycol, ethylenediamine, and ethyleneoxide.

2. The process for the preparation of ethyleneurea which comprises heating a mixture comprising ammonium carbonate and ethylenediamine.

3. The process as defined in claim 2 in which said heating is carried out at a temperature in the neighborhood of 145° C.

4. In a process for the preparation of ethyleneurea the steps comprising, forming a mixture comprising ammonium carbonate and ethylenediamine, heating the mixture to a temperature of about 145° C., cooling the mixture and extracting ethyleneurea by treatment with a solvent.

5. The process for the preparation of ethyleneurea which comprises heating ammonium carbonate with ethyleneoxide.

6. The process for the preparation of ethyleneurea which comprises heating ammonium carbonate with ethyleneglycol.

GEORGE C. HALE.

REFERENCES CITED

The following references are of record in the file of this patent:

UNITED STATES PATENTS

| Number | Name | Date |
|---|---|---|
| 2,276,696 | Olin | Mar. 17, 1942 |

OTHER REFERENCES

Fisher-Koch, Annalen, vol. 232, page 227 (1886).
Chem. Abstracts, vol. 32, page 488, citing: Annalen der Chemie, vol. 532, pages 300–301 (1937).